United States Patent
Sarkar et al.

(10) Patent No.: US 6,740,703 B2
(45) Date of Patent: May 25, 2004

(54) THICKENED AQUEOUS COATING COMPOSITIONS CONTAINING FILM-FORMING POLYMERIC BINDER

(75) Inventors: Manish Sarkar, Widmer End (GB); Stephane Patrick Belmudes, Adlestone (GB)

(73) Assignee: Imperial Chemical Industries PLC (GB)

(*) Notice: Subject to any disclaimer, the term of this patent is extended or adjusted under 35 U.S.C. 154(b) by 36 days.

(21) Appl. No.: 10/072,422

(22) Filed: Feb. 6, 2002

(65) Prior Publication Data

US 2003/0004261 A1 Jan. 2, 2003

Related U.S. Application Data

(63) Continuation-in-part of application No. PCT/EP02/00516, filed on Jan. 16, 2002.

(30) Foreign Application Priority Data

Feb. 7, 2001 (GB) .............................................. 0102943

(51) Int. Cl.[7] .................................................. C08J 3/00
(52) U.S. Cl. ........................ 524/515; 524/502; 524/558; 524/849; 525/131; 526/318.5; 526/318.6
(58) Field of Search ................................ 524/515, 502, 524/558; 526/318.5, 318.6; 525/131; 528/295.3

(56) References Cited

U.S. PATENT DOCUMENTS 5,266,598 A * 11/1993 Ninomiya et al. ........... 514/635
5,292,843 A * 3/1994 Jenkins et al. ............ 526/318.5
5,422,394 A * 6/1995 Taylor et al. ................ 524/558
5,504,123 A * 4/1996 Partan, III .................... 524/42
5,859,135 A * 1/1999 Doomen et al. ............. 525/123

FOREIGN PATENT DOCUMENTS

| GB | 1 223 552 A | 2/1971 |
|---|---|---|
| GB | 1223552 | * 2/1971 |

OTHER PUBLICATIONS

Shay, Gregory D., *Thickeners and Rheology Modifiers*, Paint and Coating Testing Manual, p. 268–285.

* cited by examiner

Primary Examiner—David W. Wu
Assistant Examiner—Henry S. Hu
(74) Attorney, Agent, or Firm—Kenneth J. Stachel

(57) ABSTRACT

A thickened aqueous coating composition (preferably paints and the like or adhesives) containing a film-forming polymeric binder which produces dried coatings having less sensitivity to water by using a thickener which is autoxidizable. Preferred autoxidizable moieties are provided by long chain fatty acids of the type used in alkyd paints and association is the preferred thickener mechanism. The moieties may form part of a compound which can take part in a copolymerization to form a cellulose-free polymeric backbone for the thickener and if the compound is not very soluble in water, the copolymerization mixture is subjected to intensive agitation to form droplets of less than 500 nm number average diameter which compensates for the lack of solubility. The thickener may serve as a binder if sufficient amounts are used.

18 Claims, 3 Drawing Sheets

THICKENED AQUEOUS COATING COMPOSITIONS CONTAINING FILM-FORMING POLYMERIC BINDER

This is a continuation-in-part of PCT/EP02/00516, filed Jan. 16, 2002.

This invention relates to a thickened aqueous coating composition containing film-forming polymeric binder and a macromolecular thickener. It also relates to a macromolecular thickener for use in the composition and to a polymerisable compound for use in making the thickener.

Thickened aqueous coating compositions are commonly used in coating surfaces found in buildings where the surfaces are usually coated at ambient temperatures of say 5 to 40° C. using for example brushes, rollers, pads or sprays as the application tools. Such compositions are often called "architectural" coating compositions and they include paints, lacquers, varnishes, woodstains and adhesives. Thickening a coating composition facilitates its loading onto application tools and its subsequent application onto architectural surfaces.

A thickened aqueous coating composition usually contains not only macromolecular thickener, water and a polymeric binder, but also particulate non-binder solids such as inorganic and/or organic pigments or opacifiers (for example rutile titanium dioxide or polymeric organic particles containing voids) or extenders (for example chalk, dolomite, clays or talc) as well as other optional ingredients such as matting agents (for example silica), structuring agents (for example titanium or zirconium chelates or laponite or bentonite clays), coalescing solvents (for example moderately volatile alcohols such as benzyl alcohol or hydrocarbons such as white spirit), antifoaming agents and biocides. After a thickened aqueous coating composition has been applied to a surface, it will dry and lose water whereupon the binder forms a film which binds together the remaining ingredients of the composition and the film bonds to the surface to form a dried coat on the surface.

A problem with dried coats obtained from thickened compositions is that residual thickener in the coat introduces a degree of water-sensitivity which manifests as a reduced so-called "wet wipe-resistance" together with a tendency for the dried coat to soften when wet which problem will be called "wet-softening". For this reason, thickener concentrations are usually kept below 2 wt % of non vol thickener per 100 g paint composition. The problem is especially troublesome if the dried coat has been obtained from a fluid coating composition in which the volume of particulate solid material is below 30 vol % (based on the total volume of the fluid coating composition) and especially when the volume of the binder in the composition is below 20 vol %. This is because amounts of thickener well above 3 wt % are needed to give the coating compositions viscosities which are high enough for practical use. The problem is further aggravated if the dried coat contains a high volume percentage of particulate non-binder solids for such dried coats are less strongly bound and so are more sensitive to water. The volume percentage of non-binder particulate solids in a dried coat is conventionally called "Pigment Volume Content" or "PVC" even though solids other than pigments may be involved. Serious water-sensitivity arises in conventional dried coats if the PVC is above 70%.

Thickeners inevitably introduce further water-sensitivity into a dried coat because they are necessarily hydrophilic materials as will be explained towards the end of the following brief review of their usefulness in architectural coating compositions. A good account of thickeners and the closely related materials often known as "rheology modifiers" is given by G D Shay in Chapter 30 (headed "Thickeners and Rheology Modifiers") of the book "Paint and Coating Manual: $14^{th}$ Edition of the Gardner-Sword Handbook" edited by J V Koleske and published in 1995 by ASTM of Philadelphia. The contents of this Chapter 30 are herein incorporated by reference. The distinction between "thickeners" and "rheology modifiers" is somewhat arbitrary and so for the purposes of this Specification, the term "thickener" will be used to include "rheology modifier" too. Shay describes "rheology modifiers" as "inefficient thickeners" which have to be used in concentrations of over 18 g/liter (i.e. over 1.8 wt %) if a useful thickening effect is needed.

Shay explains that architectural coating compositions need to have viscosities which are high enough under all rates of shear, namely under high shear rates of over 1000/sec, moderate shear rates of from 10 to 1000/sec and low shear rates of below 10/sec. In the field of architectural coatings, viscosity is conveniently measured at 18° C. using a concentration of 2 wt % thickener based on the combined weight of water and thickener. A suitable high shear rate viscosity enables the coating compositions to be applied by brush, roller or pad in thicknesses which allow the resulting dried coat to hide blemishes on a surface and so minimise the need for further coatings to be applied. Preferably the high shear rate viscosity should be from 0.05 to 0.25 Pa.sec when measured by an ICI Cone and Plate viscometer as described in ASTM Test D 4287-88, the contents of which are herein incorporated by reference.

A suitable moderate shear rate viscosity facilitates mixing and pumping operations during the manufacture of the coating composition and also gives them a so-called "consistency" which appeals subjectively to many users. Preferably the moderate shear rate viscosity should be from 0.1 to 2.0 Pa.sec when measured by a Sheen Rotothinner viscometer as described in the Sheen Data Sheet called "Sheen/ICI Rotothinners" available from Sheen Instruments Ltd of Kingston on Thames, England. The contents of this Data Sheet are herein incorporated by reference.

A suitable low shear rate viscosity inhibits settling of solid ingredients when the coating compositions are being stored. Secondly, such a low shear rate viscosity reduces the risk of liquid coating compositions flowing down vertical surfaces to which they have just been applied. Such flow creates a disfiguration known as "sagging". Thirdly, it enables large amounts of coating composition to be loaded onto a tool such as a brush or roller. Preferably the low shear rate viscosity should be from 20 to 150 Pa.sec when measured by a Brookfield viscometer as described in ASTM Test D2196 using Spindle No. 3 at a rotation speed of 12 rpm. The contents of ASTM Test D2196 are herein incorporated by reference.

Most formulations of film-forming polymeric binders and particulate solids in water do not have a sufficiently high viscosity under one or more of the shear rate conditions discussed above. This is particularly true if the fluid coating composition contains less than 30% by volume of solid materials and especially if it contains less than 20% of binder. Therefore, as reported by Shay, the viscosities of the formulations are conventionally increased by the addition of from 3 to 18 g of a thickener per liter of coating composition, ie concentrations of 0.3 to 1.8 wt %. According to Shay, the increase in viscosity is caused by broadly one of three mechanisms operating either alone or in combination. The three mechanisms are known as "hydrodynamic", "flocculative" and "associative". All three comprise interactions which involve macromolecules containing polymeric backbones having high weight average molecular weights of over 30,000 and preferably over 50,000.

Viscosities at all three shear rates can be conveniently measured together using a "Carri-Med" CSL 100 rheometer as supplied by TA Instruments Limited of Leatherhead, England.

The hydrodynamic mechanism is the primary mechanism employed by traditional macromolecular thickeners such as the gums, cellulose derivatives, polyethoxylates, polyacrylamides, polyvinyl alcohols and others listed by Shay in his Table 2. The mechanism requires a water-sensitive macromolecular thickener comprising a high molecular weight hydrophilic backbone devoid of any significant hydrophobic character. On adding the thickener to water, its hydrophilic backbones uncoil and occupy a large hydrodynamic volume in the solution so immobilising large volumes of water and thereby creating a substantial increase in viscosity.

The flocculative mechanism is a mechanism also employed by traditional thickeners comprising high molecular weight hydrophilic backbones which are water-sensitive and devoid of significant hydrophobic character. In this mechanism, the hydrophilic nature of the thickener causes it to concentrate with the water into predominantly aqueous regions of the coating composition whilst particles of polymeric binder form and concentrate in predominantly hydrophobic regions. The concentrated binder particles touch each other and form flocs which impede flow and thereby substantially increase the viscosity of the coating composition.

The associative mechanism requires a more recent type of thickener known as an "associative thickener" such as those listed by Shay in his Tables 4 and 5. Like traditional thickeners, associative thickeners are macromolecular and must raise the viscosity of water or other aqueous media either by virtue of their solubility or because they become water soluble by a simple change in pH, for example by the neutralisation of acidic or basic groups incorporated into the thickener. They must also contain a high molecular weight backbone having hydrophilic character. However, in associative thickeners, the hydrophilic moieties are adjacent to hydrophobic moieties sometimes called "hydrophobic modifications". When the associative thickener is added to an aqueous coating composition, the hydrophilic moieties attract large volumes of water whilst the hydrophobic moieties associate with like moieties on other backbone chains and/or they associate with hydrophobic moieties on hydrophobic particles in the composition such as particles of binder or pigment, opacifier or extender. This association creates shear reversible three-dimensional physical networks which are bulky and entrap large volumes of water thereby impeding flow and causing a substantial increase in the viscosity of the coating composition.

It will be seen from the above review that the presence of hydrophilic character is essential to the mechanism by which thickeners thicken aqueous coating compositions. This means that the presence of hydrophilic residues is inevitable in dried coats obtained from thickened coating compositions which explains why the use of thickeners has hitherto been inevitably linked with an increase in the water-sensitivity of the dried coats. An illustration of the use of a particular type of thickener in an aqueous coating is provided by Partan in U.S. Pat. No. 5,504,123 issued in 1996. Partan discloses the use of an associative thickener comprising high molecular weight (10,000 to 500,000) water-sensitive cellulose ether chains onto which have been grafted autoxidisable moieties (as described later in this specification) containing from 4 to 20 carbon atoms. When a coating of the composition is allowed to dry, the moieties autoxidise and produce a dried coat which is harder and more durable. A problem with cellulose ether chains is that their hydroxyl groups cause high viscosities in water and unfortunately, the grafting of the autoxidisable moieties onto cellulose ether chains which already have a high viscosity produces even higher viscosity thickeners which accordingly can only be used in low concentrations in the coating compositions, for example concentrations of 0.05 to 3 wt % as proposed by Partan. Reducing the molecular weight of such cellulose ether chains in order to reduce the viscosity increases the water sensitivity resulting in poorer performance. The inability to use high concentration of autoxidisable cellulose ether thickeners is an especial disadvantage when the dried coats have been obtained from fluid coating compositions containing less than 30 vol % of particulate solids and more so if the dried coats also contain less than 20 vol % of binder and that this is particularly so if the dried coat has a high PVC, for example a PVC of above 70%.

An object of this invention is to provide thickened aqueous coating compositions containing a macromolecular thickener and a film-forming polymeric binder which compositions produce dried coats of less water-sensitivity and so can tolerate larger concentrations of thickener. Another object is to provide thickened coating compositions containing low volumes of solid materials, especially binder which can nevertheless give dried coats having a PVC of over 70% and which have adequate resistances to wet-wiping and wet-softening. A related object is to provide a thickener for use in such coating compositions and a polymerisable compound for use in making the thickener. A further object it to provide a thickener which can in some circumstances also serve as the polymeric binder so avoiding the need for the coating composition to contain a separate polymeric binder.

Accordingly, this invention provides a thickened aqueous coating composition of a chosen pH which contains a polymeric binder and a macromolecular thickener
  a) which thickener contains macromolecules having moieties which are hydrophilic at the chosen pH and
  b) which thickener on dispersion in water at a concentration of 2 wt % (based on the combined weights of the thickener and water) has a low shear viscosity of at least 0.1 Pa.sec (preferably 1 to 20 Pa.sec) when measured at 18° C. on a Brookfield viscometer using a No. 3 Spindle rotating at 12 rpm
wherein the macromolecules are cellulose-free and contain autoxidisable moieties thereby creating a cellulose-free autoxidisable thickener. The compositions may contain over 3 wt % (often even over 10 wt %) of thickener and still be easy to handle and give dried coatings which are not unduly water-sensitive. Of course compositions containing less than 3 wt % of the thickener may also be made. The coating compositions are preferably architectural coatings including paints, lacquers, varnishes, woodstains and adhesives.

"Autoxidisable moieties" are moieties which can react with oxygen at ambient temperatures usually in the presence of catalyst known as a "drier" to produce crosslinks to other oxidisable moieties on adjacent like macromolecules. Autoxidation is the process by which conventional solvent borne alkyd paints form dried coats having amongst other things good wet-wipe and wet-softening resistances. It has now been found that autoxidation can likewise confer wet-wipe and wet-softening resistances on dried coats obtained according to this invention including those having a PVC of over 70% and/or obtained from fluid coating compositions containing only low volumes of solid particulate materials.

A good account of the way in which alkyd paints oxidise is given on pages 156 to 160 of the book "Introduction to Paint Chemistry" by GPA Turner published in 1988 by Chapman and Hall of London. The contents of these pages are herein incorporated by reference. It should be explained that this type of oxidation is also known as "drying" even though the oxidation mechanism itself does not depend on the loss of liquid by volatilisation. Turner illustrates autoxidisable moieties which comprise ethylenic double bonds and "driers" which are soaps of polyvalent metals such as for example the octoates or naphthenates of cobalt or manganese and which catalyse the autoxidation reaction. Zirconium soaps are also used as driers. Driers are used in various concentrations and these can be readily determined by those skilled in the art. Typically, up to 0.2 wt % of the metal based on the total paint composition is used.

Autoxidation may be accelerated by the presence of easily oxidised compounds and especially polyunsaturated compounds such as maleinised polybutadiene where the polybutadiene moieties have a weight average molecular weight of from 3,000 to 7,000 and where the maleic moieties provide dispersibility in water. Preferably the coating composition contains from 0.1 to 1 wt % of these easily oxidised compounds.

Autoxidisable moieties may be obtained from a wide variety of unsaturated materials, but those most commonly used in, for example, alkyd paints are derived from long chain unsaturated fatty acids containing from 12 to 30 carbon atoms. A list of such fatty acids is provided on pages 215 and 216 of Volume 1 of the book "Outlines of Paint Technology" by W M Morgans and published in 1982 by Griffin of London and the contents of these pages are herein incorprated by reference. Amongst the commercially more important fatty acids listed by Morgans are linseed oil fatty acid, soya bean oil fatty acid, safflower and sunflower oil fatty acids and tall oil fatty acid. These long chain fatty acids are also examples of fatty acids useful in making the autoxidiseable thickeners of this invention. Use of such long chain fatty acids also has the advantage of introducing hydrophobic moieties into the thickener providing it with means for use in associative thickening mechanisms.

A most preferred technique for introducing the autoxidisable moieties involves taking a copolymerisable compound, or monomer, containing a long chain unsaturated fatty acid moiety and copolymerising it with other monomers used in the production of the thickener macromolecules. Some of these other monomers will have moieties which are hydrophilic at the pH chosen for the coating composition. In effect, the copolymerisation creates a macromolecule having a backbone which contains hydrophilic moieties adjacent to hydrophobic long chain fatty acid moieties which depend from the backbone. A reaction scheme for this type of copolymerisation is shown in FIG. 1 of the drawings. Preferably, the copolymerisable compound containing the fatty acid moiety should comprise from 2 to 30 wt % (and especially 4 to 15 wt %) of the monomers which are copolymerised to create the macromolecules of the thickener. Generally the monomers containing the hydrophilic moieties should comprise from 10 to 40 wt % (especially from 20 to 40%) of the monomers copolymerised to create the macromolecules.

Conveniently available co-monomers for use in forming the remainder of the polymeric backbone include alkyl esters of unsaturated carboxylic acids such as the methyl, ethyl, butyl and 2-ethylhexyl esters of acrylic or methacrylic acids, vinyl esters such as vinyl acetate or vinyl "Versatates"[1], α-olefins such as ethylene, propylene or butene-1 and styrene or its homologues. Copolymerised styrene and its homologues have the additional advantage of being particularly active in generating and coupling to free radicals and so they promote the autoxidation process which in turn accelerates the onset of water-resistance.

[1] Vinyl "Versatate" is the vinyl ester of so-called "Versatic" acid which is a mixture of aliphatic monocarboxylic acids each containing an average of 9, 10 or 11 carbon atoms and is commercially available from the Shell Chemical Company of Carrington, England.

The hydrophilic character which is essential to the thickening mechanisms may be provided by co-monomers containing hydrophilic moieties such as hydroxyl or ionic groups. Examples of co-monomers which can provide hydroxyl groups include hydroxyethyl acrylate or vinyl acetate after it has been subsequently hydrolysed to give a notional copolymerised vinyl alcohol. Other co-monomers such as carboxylic acids or their anhydrides or amides can introduce hydrophilic character provided that an appropriate pH is chosen for the coating composition. Choosing a pH above 7 converts carboxylic groups in the copolymerised carboxylic acids or anhydrides into hydrophilic carboxylate anions. Again, suitable carboxylic acid/anhydrides include acrylic, methacrylic, crotonic or itaconic acids or maleic or succinic anhydrides. Likewise choosing a pH below 7 converts amino and amido groups in copolymerised amino/amides to hydrophilic cations. Suitable amino/amide co-monomers include dimethylaminoethyl or tertiarybutylaminoethyl methacrylates or acrylamide or methacrylamide. Sodium acrylamidopropane sulphonic acid is an example of a co-monomer which can be given either an anionic or a cationic hydrophilic character.

The copolymerisable compound containing the fatty acid moiety may be the diester formed by reacting the long chain fatty acid with the oxirane group in an ethylenically unsaturated monomer such as glycidyl acrylate or methacrylate. Such a reaction produces a copolymerisable autoxidisable monomer of hydroxypropylene diester comprising unsaturated long chain fatty acid moiety linked to an unsaturated carboxylic acid ester by the divalent hydroxypropylene group. The unsaturation in the unsaturated carboxylic acid ester is then available for copolymerisation with the other monomers to form the backbone of a thickener macromolecule whilst the unsaturation in the dependant long chain fatty acid derivatives renders the thickener autoxidisable. Preferably the copolymerisable compound is stored at low temperature to improve its storage stability.

Hydroxypropylene diesters being the reaction products of unsaturated long chain fatty acids and copolymerisable carboxylates have the advantage of being relatively easily available but they also suffer the disadvantage of having a very low solubility in water which inhibits their activity in conventional aqueous copolymerisation processes unless environmentally unwelcome amounts of organic co-solvent are also present. It has been discovered that this problem can be solved by stirring the co-monomers (including the copolymerisable compound such as the diester) together with water, polymerisation initiator and surfactant and then subjecting the stirred mixture to intensive agitation sufficient to create a very large number of very small (less than 500 nm in diameter) droplets of co-monomer. The polymerisation initiator may be water soluble or oil soluble; that is to say soluble in the monomers. When an oil soluble initiator, such as lauroyl peroxide is used, it is preferred that it is first dissolved in the monomers and subjected to the intensive agitation prior to causing the polymerisation to proceed. When a water soluble polymerisation initiator is used, such as for example ammonium persulphate, it may be added either before or after intensive agitation. When such a water soluble initiator is used, copolymerisation is initiated in the water phase but then the copolymerising system will migrate into organic zones created by the droplets where copolymerisation will continue. The migration will be quick because it is favoured by the high surface area provided by the very large number of very small droplets of co-monomer. This migration permits effective copolymerisation of very low water-solubility monomers, in this case the autoxidiseable copolymeriseable compounds.

The most preferred diester comprises methacrylate moieties and moieties derived from tall oil fatty acid.

Polymerisation can be effected by raising the temperature. Preferably temperatures of 30 to 98° C. are used. Additionally and alternatively, a redox initiator system may be used. Suitable examples of such systems include hydrogen peroxide and ascorbic acid, ammonium persulphate and sodium metabisulphite or sodium sulphoxylate formaldehyde. Optionally, metal salts such as copper or iron salts may be added.

The required intensive agitation may be provided by mechanical emulsifiers such as a Ross 100 (available from Ross and Son, Hauppauge, N.Y., USA) or a Silverson (available from Silverson Machines Ltd, Chesham, Buckinghamshire, UK) or an IKA emulsifier (available from IKA-Works Inc, Cincinnati, Ohio, USA). Alternatively, a Sonolator (available from Sonic Corp, Stratford, Conn., USA) may be used which employs ultrasound to generate the required shear. Preferably, agitation is sufficiently energetic to produce eventual particles of thickener which in the unneutralised state have a number average particle size of below 500 nm and preferably below 300 nm.

A more hydrophilic diester would have the twin advantages of being capable of a purely aqueous emulsion copolymerisation without the need for intensive agitation and greater efficiency as a thickener. One way to increase water solublity of the water-insoluble diesters is to introduce hydrophilic character into otherwise hydrophobic groups pendant from the polymeric backbone. This can be conveniently done by linking the fatty acid derivatives to the unsaturated carboxylate by means of a polyethoxylate or similar polyether divalent radical instead of by the divalent hydroxypropylene group used above.

Alternative techniques for obtaining useful copolymerisable diesters involve alcoholysis followed by an esterification or transesterification. Preferred techniques comprise the alcoholysis of an unsaturated triglyceride by a polyol which is usually a diol. The alcoholysis converts the triglyceride to a mixture containing mono- or di-glycerides which contain respectively two or one hydroxyls whilst at least some of the polyol is converted to an ester containing at least one hydroxyl. These hydroxyls provide means for bonding the esters to monomers copolymerisable with the other co-monomers which copolymerise to produce the thickener macromolecule. Preferred triglycerides are the oils used as a source of the unsaturated long chain fatty acids mentioned above, especially linseed oil, soya bean oil, safflower seed oil, sunflower seed oil or tall oil. Preferred diols are 1,3 butene diol and neopentyl glycol.

The above hydroxyl containing esters may be bonded to copolymerisable monomers to form a diester by co-reaction with carboxylic acid groups, carboxylic anhydrides or oxirane groups associated with the monomer or by a transesterification. The preferred co-reactants are anhydrides and particularly methacrylic anhydride. Transesterification is preferably performed using $C_1$ to 8 alkyl esters of unsaturated carboxylic acids such as the methyl, ethyl, butyl, or ethylhexyl esters of acrylic, methacrylic, crotonic or itaconic acids. Both the co-reaction and the transesterification each produce unsaturated diesters useful in making thickener macromolecules. However, the intense agitation technique may need to be employed if the diesters are not very water-soluble.

In the field of thickener macromolecules, the polymeric backbone of the macromolecule is generally regarded as being the longest chain of carbon atoms optionally also containing oxygen and/or nitrogen atoms which exists in the macromolecule excluding any primary hydrophobic side chains. Examples of typical polymeric backbones are shown in FIGS. 2 to 4 of the drawings. Other moieties such as hydrophobic, hydrophilic and especially the autoxidisable moieties may depend from the backbone. The backbone should have a molecular weight average of at least 35,000, preferably at least 50,000 and usually from $10^5$ to $10^6$.

In addition to increasing the viscosity of the coating composition and decreasing the water-sensitivity of the dried coats, the thickener may also autoxidise to form a binder film and so if sufficient autoxidisable moieties are present, the thickener may serve as the sole binder. The amount of autoxidisability needed will depend on the PVC of the composition with higher PVC's needing more autoxidisability especially where the PVC exceeds 70%.

This invention also provides an aqueous thickener dispersion of chosen pH for use in coating compositions a) which thickener contains macromolecules having moieties which are hydrophilic at the chosen pH and b) which thickener on dispersion in water at a concentration of 2 wt % (based on the combined weights of the thickener and water) has a low shear viscosity of at least 0.1 Pa.sec when measured at 18° C. on a Brookfield viscometer using a No. 3 Spindle rotating at 12 rpm wherein the macromolecules are cellulose-free and also contain autoxidisable moieties, thereby creating a cellulose-free autoxidisable thickener.

This invention further provides an autoxidisable copolymerisable compound for use in making a thickener according to this invention wherein the compound is a diester containing a divalent hydroxypropylene group or a divalent polyoxyethylene group and moieties which are esters of acrylic and/or methacrylic acid and a long chain unsaturated fatty acid moiety.

Procedure for Assessing Wet-Wipe Resistance:

The Wet-Wipe Resistance of a dried coat of paint is assessed as follows:

The surface of a board is painted with a commercial vinyl acrylic high PVC emulsion paint (Dulux® Supermatt) by spray application at a spreading rate of approximately 10 square meters per liter and allowed to dry at room temperature (15 to 20° C.) for 48 hours. The painted surface is then further painted with a brush using the thickened aqueous paint which is to be assessed. The newly painted surface is allowed to dry at room temperatures for one hour and then different samples of the painted surface are stored at room temperatures for periods of one, two, three and four weeks respectively.

After storage, each sample is wiped 20 times with a wet rag and the amount of paint removed is assessed visually and assigned a value according to the following scale:

1=very poor, paint removed within 1–5 wipes.

3=quite poor, giving soapy sensation at 10 wipes, lots of paint on rag.

5=poor, giving soapy sensation at 18–20 wipes.

7=little paint removed, gives no soapy sensation.

10=no paint removed at all.

The invention is further illustrated by the following Examples of which Examples A to C are comparative.

EXAMPLE 1
Process for the Production of a Copolymerisable Cellulose-Free Autoxidisable Monomer:

500 g of tall oil fatty acid (TOFA), 8.0 g of cetyl trimethyl ammonium bromide and 0.7 g of hydroquinone were all charged under nitrogen to a one liter round bottom flask fitted with a reflux condenser and a stirrer. The contents of the flask were stirred and heated to 80° C. and then 355.0 g of glycidyl methacrylate were added gradually over a period of 3 hours whilst a temperature of 80° C. and stirring were maintained. The temperature of 80° C. and the stirring were maintained for a further 9 hours.

During the process, TOFA reacted with oxirane moieties in the glycidyl methacrylate to form a copolymerisable diester in which unsaturated methacrylate moieties were linked to an autoxidisable TOFA carboxylate by a hydroxypropylene divalent group. The reaction was catalysed by the cetyl trimethyl ammonium bromide and premature polymerisation was inhibited by the hydroquinone. The resulting monomer was stored in a fridge at about 4° C. prior to use. A molar excess of the glycidyl methacrylate over TOFA is used.

EXAMPLE 2
Alternative Process to That of Example 1:

The procedure of Example 1 was repeated except that the catalyst was 11.3 g of tetra-ethyl ammonium bromide, the addition of the glycidyl methacrylate was made over a period of two hours and the temperature of 80° C. and stirring were maintained for a further 3 hours instead of 9.

As in Example 1, the reaction of TOFA and glycidyl methacrylate formed a copolymerisable diester. The resulting monomer was stored in a fridge at about 4° C. prior to use.

EXAMPLE 3
Alternative Copolymerisable Cellulose-Free Autoxidisable Monomer Having a Greater Hydrophilicity:

40.0 g of a hydroxypolyethoxy tall oil carboxylate (in this case Tall oil fatty acid ethoxylate with 6 ethylene oxide units) and 0.2 g of hydroquinone were charged under nitrogen to a one liter round bottom flask fitted with a reflux condenser and a stirrer. The polyethoxy moiety contained a number average of 6 ethoxy units. The contents of the flask were stirred and heated to 100° C. and then 15.0 g of methacrylic anhydride were added over a period of one hour. The temperature of 100° C. and the stirring were maintained for a further 3 hours.

During the process, the hydroxypolyethoxy moiety esterified the methacrylic anhydride to form a copolymerisable diester in which unsaturated methacrylate moieties became linked to tall oil carboxylate by a polyethoxy divalent group. The presence of the polyethoxy link conferred increased hydrophilicity on the diester as compared with the hydrophilicity of the autoxidisable monomer produced in Examples 1 or 2.

EXAMPLE 4
Process for the Production of an Autoxidisable Cellulose-Free Thickener Which Will be Called "Thickener Eg 4":

The following co-monomers and hexanol were mixed together in a glass beaker at ambient temperatures:

| | |
|---|---|
| Ethyl Acrylate | 165.00 g |
| Methacrylic Acid | 94.00 g |
| Methyl Methacrylate | 5.60 g |
| Copolymerisable Monomer of Example 1 | 23.50 g |
| Hexanol | 1.35 g |

The mixture was added slowly with stirring to a solution of 2.00 g of sodium dioctyl sulphosuccinate (SDSS) surfactant in 386.00 g of water. The new mixture so obtained was subjected to intensive agitation for 10 minutes using a Silverson mixer rotating at high speed whereupon an emulsion was obtained comprising very fine droplets of organic monomers.

The emulsion was gradually pumped over 3 hours into a solution of 0.10 g SDSS surfactant and 2.50 g ammonium persulphate polymerisation initiator in 808.20 g water maintained at 80.degree. C. under nitrogen in a round bottom flask fitted with a reflux condenser and a stirrer. Copolymerisation began and the temperature of 80.degree. C. and stirring were maintained for a further 30 minutes after pumping had been completed. Then a second solution comprising 0.27 g of ammonium persulphate in 2.20 g water was added followed by a second period of 30 minutes at 80.degree. C. with stirring. Lastly, a solution of 0.18 g sodium sulphoxylate formaldehyde in 2.00 g water was added followed by a final period of 30 minutes at 80.degree. C. with stirring. The contents of the flask were filtered and a latex of particulate macromolecular thickener was obtained in which the particles had a number average particle size of 314 nm.

The macromolecules contained a backbone consisting of copolymerised acrylate, methacrylate and methacrylic acid moieties which acid moieties confer hydrophilic character on the macromolecules when they experience a change in pH to above 7. Hydrophobic moieties comprising tall oil carboxylate depend from the backbone to which they are connected via a divalent hydroxpropylene group. The hydrophilic moieties and their adjacent hydrophobic moieties allow the macromolecules to act as an associative thickener when in solutions of pH above 7 and preferably between 9 to 9.5.

EXAMPLE 5
Autoxidisable Cellulose-Free Associative Thickener Containing Styrene as Autoxidation Promoter Which Will be Called "Thickener Eg 5":

The process of Example 4 was repeated but with the following modifications:

1. The mixture of co-monomers was as follows:

| | |
|---|---|
| Ethyl Acrylate | 165.00 g |
| Methacrylic Acid | 92.00 g |
| Methyl Methacrylate | 6.20 g |
| Styrene | 15.00 g |
| Copolymerisable Monomer of Example 1 | 26.00 g |

2. The surfactant solution contained 5.00 g of SDSS in 386.70 g of water.
3. The initiator solution in the round bottom flask consisted of 0.10 g of SDSS and 2.50 g of ammonium persulphate in 808.00 g of water.
4. The solution of additional initiator consisted of 0.27 g ammonium persulphate in 2.16 g water.
5. The solution of formaldehyde derivative consisted of 0.18 g of sodium sulphoxylate formaldehyde in 2.07 g water.

The particle size of the dispersion was 220 nm.

The autoxidisable macromolecules could act as associative thickeners when in a solution of pH above 7 and preferably between 9 to 9.5.

EXAMPLE 5A
Alternative Autoxidisable Cellulose-Free Associative Thickener Containing Styrene as Autoxidation Promoter Which Will be Called "Thickener Eg 5A"

The process of Example 5 was repeated except that the copolymerisable monomer of Example 1 was replaced with the copolymerisable monomer of Example 2. The autoxidisable macromolecules could act as associative thickeners when in a solution of pH above 7 and preferably between 9 to 9.5.

EXAMPLE 6
Alternative Cellulose-Free Associative Thickener Having Increased Hydrophilicity Which Will be Called "Thickener Eg 6":

The process of Example 4 was repeated but with the following modification:

The mixture of co-monomers and hexanol was as follows:

| | |
|---|---|
| Ethyl Acrylate | 68.00 g |
| Methacrylic Acid | 23.50 g |
| Copolymerisable Monomer of Example 3 | 10.00 g |
| Hexanol | 0.40 g |

The particles of thickener had a number average particle size of 193 nm and comprised copolymeric autoxidisable macromolecules. Hydrophobic tall oil carboxylates (the copolymerisable monomer of Example 3) were attached to the backbone via a polyethoxy divalent group which made the macromolecules more water-soluble on increasing the pH to above 7. The macromolecules were able to act as associative thickeners in solutions of pH above 7.

COMPARATIVE EXAMPLE D
Associative Cellulose-Free Thickener Having No Autoxidisable Group Which Will be Called "Thickener Eg D":

The process of Example 4 was repeated but with the following modification:

The mixture of co-monomers and hexanol was as follows:

| | |
|---|---|
| Ethyl Acrylate | 203.00 g |
| Methacrylic Acid | 101.70 g |
| Styrene | 15.00 g |
| Stearyl methacrylate | 33.90 g |
| Hexanol | 1.35 g |

The particles of thickener had a number average particle size of 191 nm. The macromolecules were able to act as non-autoxidisable associative thickeners in solutions of pH above 7.

EXAMPLES 7 TO 10 AND COMPARATIVE EXAMPLES A TO D
Wet-Wipe Resistance of Dried Coats Obtained from Thickened Aqueous Paints:

In Examples 7 to 10, thickened aqueous paints were made using autoxidisable associative thickeners as provided by this invention and conventional ingredients all as specified in Tables 1 and 2. Similarly thickened aqueous paints were made up in Comparative Examples A to D except that commercially available non-autoxidative associative thickeners were used in Comparative Examples A to C and "Thickener Eg D" was used in Comparative Example D. Again the ingredients and amounts used are specified in Tables 1 and 2.

Each paint was made up using the following procedure. The dispersant, biocide, coalescing solvent and antifoaming agent were all dissolved in a 50% portion of the water. The chalk, clay and rutile were added to the solution which was then subjected to high speed dispersion using a "Dispermat" mixer operating at 400 rpm. Meanwhile the binder latex and any accelerator and cobalt drier needed had been stirred into the other 50% portion of the water. The thickener and ammonia were next stirred into this other portion of water and the two portions of water were stirred together to produce the final paint formulation. The surface was of plasterboard previously painted with Dulux Supermatt and aged for a week prior to being coated with the test paints. Each test paint was applied to a surface and allowed to dry for one hour at room temperature to produce a dried coat. The dried coats were then stored at room temperatures for periods of 1, 2, 3 and 4 weeks and after a coat had been stored for one of these periods, its Wet-Wipe Resistance was assessed using the procedure described earlier in this specification.

The assessments and the periods after which they are made are shown in Table 3 together with the PVC of the dried coats and the amount (in parts by weight) of thickener used in the aqueous paint (i.e. before the paint has begun to dry).

Table 3 shows that the use of autoxidisable thickeners substantially increases the Wet-Wipe Resistance of the dried coats even when the PVC of the dried coats exceeds 70% and even when the amount of thickener used exceeds that used for conventional non-autoxidisable associative thickeners by a factor of at least 3 and sometimes over 5. This ability to use much larger amounts of thickener enables thicker aqueous coating compositions to be made when the thickener is autoxidisable as is illustrated by the viscosities shown in Table 4. Table 3 Examples 7 and 8 demonstrate the benefits of incorporating styrene in the macromoleclar thickener. A preliminary pre-storage inspection indicated that the autoxidation of the paint of Example 10 was slow owing to the absence of the unsaturated accelerator.

TABLE 1
INGREDIENTS OF THE PAINT FORMULATIONS

| | Examples: Parts by weight | | | | | | | |
|---|---|---|---|---|---|---|---|---|
| Ingredient | 7 | 8 | 9 | 10 | A | B | C | D |
| Dispersant | 0.30 | 0.30 | 0.10 | 0.30 | 0.50 | 0.30 | 0.30 | 0.30 |
| Biocide | 0.20 | 0.50 | 0.01 | 0.20 | 0.50 | 0.50 | 0.20 | 0.20 |
| Coalescing Solvent | 0.70 | 0.50 | 4.00 | 0.40 | 0.40 | 0.50 | 0.70 | 0.50 |
| Antifoaming Agent | 0.30 | 0.20 | 0.04 | 0.10 | 0.20 | 0.20 | 0.30 | 0.20 |
| Water | 51.01 | 37.50 | 43.29 | 42.59 | 46.30 | 44.00 | 55.1 | 45.69 |
| Chalk | 12.60 | 21.20 | 26.00 | 19.20 | 20.60 | 21.60 | 12.9 | 19.20 |
| China Clay | 14.00 | 14.80 | — | 16.30 | 14.40 | 15.00 | 14.0 | 16.30 |
| Rutile | 7.40 | 6.10 | 6.40 | 6.00 | 6.00 | 6.30 | 7.40 | 6.00 |
| Binder Latex | 5.30 | 5.70 | — | 3.60 | 9.70 | 10.20 | 7.00 | 5.20 |
| Accelerator | 0.39 | 0.99 | 0.88 | — | — | — | — | 0.50 |
| Cobalt Drier | 0.01 | 0.01 | 0.02 | 0.01 | — | — | — | 0.01 |
| Thickener Eg 4 | 7.60 | — | — | 11.00 | — | — | — | — |
| Thickener Eg 5a | — | 11.90 | — | — | — | — | — | — |
| Thickener Eg 5 | — | — | 19.00 | — | — | — | — | — |
| Conventional Thickener | — | — | — | — | 1.10 | 1.10 | 1.90 | — |

TABLE 1-continued

INGREDIENTS OF THE PAINT FORMULATIONS

| | Examples: Parts by weight | | | | | | | |
|---|---|---|---|---|---|---|---|---|
| Ingredient | 7 | 8 | 9 | 10 | A | B | C | D |
| Thickener Eg D | — | — | — | 0.30 | — | — | — | 5.60 |
| Ammonia solution (33–35%) | 0.20 | 0.30 | 0.26 | | 0.30 | 0.30 | 0.20 | 0.28 |
| Total | 100.0 | 100.0 | 100.0 | 100.0 | 100.0 | 100.0 | 100.0 | 100.0 |

Viscosities at increasing and decreasing shear rates were measured using a Cari-Med CSL 100 rheometer. Measurements were made with increasing shear rate (up) and then after a 2 minute pause, with decreasing shear rate (down). The differences in the viscosities measured at increasing and decreasing shear rate viscosities indicate thixotropy. All were thixotropic.

TABLE 2

DETAILS OF THE INGREDIENTS

| Ingredient | Details |
|---|---|
| Dispersant | "Calgon": Ellis Everard Ltd of Bradford, UK |
| Biocide | V 189: KMZ Chemicals Ltd of Cobham, UK |
| Coalescing Solvent | "Texanol": Eastman Chemicals (UK) Ltd of Liverpool, UK |
| Antifoaming Agent | "Foamaster" G: Henkel of Madison Heights, MI, USA |
| Binder Latex | "Emultex" 4057: A vinyl/acrylic latex from Revertex Chemicals Ltd of Hartlepool, UK |
| Accelerator | "Lithene": A 25 wt% maleinised polybutadiene of molecular weight 5000 from Revertex Chemicals Ltd of Hartlepool, UK |
| Conventional Thickener | "Acrysol" DR1 associative thickener: Rohm and Haas (UK) Ltd of Croydon, UK. |
| Thickener Eg D | Thickener of Comparative Example D which includes copolymerised styrene. |
| DER 333 | Diepoxy resin available from Dow Chemical Canada Sarma Ontario Canada N7T 7K7 |

An unexpected benefit is that increased amounts of autoxidisable thickener produced increased Wet-Wipe Resistances whereas an increase in conventional thickener would decrease Wet-Wipe Resistance. It is presumed that this benefit is possible because the increase in autoxidisability brings an increase in Wet-Wipe Resistance which offsets the decrease which might be expected from an increased amount of hydrophilic moieties.

TABLE 3

ASSESSMENT OF WET-WIPE RESISTANCE ON A SCALE OF 1 (POOR) TO 10 (GOOD)

| Period after which Assessment Performed | Example and Assessment | | | | | | | |
|---|---|---|---|---|---|---|---|---|
| | 7 | 8 | 9 | 10 | A | B | C | D |
| After 1 week | 6 | 5 | 9 | 3 | 1 | 2 | 4 | 2 |
| After 2 weeks | 6 | 7 | 9 | 4 | 2 | 2 | 4 | 3 |
| After 3 weeks | 7 | 8 | 9 | 5 | 3 | 3 | 5 | — |
| After 4 weeks | 8 | 9 | 9 | 6 | 3 | 3 | 5 | — |
| PVC of Dried Coat | 74 | 72 | 76 | 77 | 73 | 73 | 74 | 77 |
| *Parts by Weight of Thickener solution in Paint | 7.6 (1.5) | 11.9 (2.5) | 19 (3.8) | 11.2 (2.5) | 1.1 (0.3) | 1.1 (0.3) | 1.9 (0.6) | 5.6 (1.2) |

*Numbers in brackets refer to weight of dry thickener per 100 g of wet paint composition

TABLE 4

VISCOSITIES OF THICKENED PAINTS

| Shear Rate Up then Down | Examples: Viscosity in Pa.sec | | |
|---|---|---|---|
| | 7 | A | B |
| *Low | 172 | 69 | 129 |
| *Medium | 2.32 | 1.95 | 3.7 |
| *High | 0.21 | 0.21 | 0.27 |
| **High | 0.21 | 0.17 | 0.27 |
| **Medium | 2.1 | 1.5 | 3.2 |
| **Low | 106 | 49 | 98 |

*Up **Down

Low shear=0.1/sec: medium shear=40/sec: high shear=1000/sec

EXAMPLES 11 TO 13

Alternative Method for Providing Cellulose-Free Autoxidisable Thickener Using Esterification and Transesterification:

Firstly, a mixture of autoxidisable hydroxy esters was made by the alcoholysis of soya bean oil (Example 11), safflower seed oil (Example 12) or linseed oil (Example 13). The alcoholysis was carried out using 1,3-butene diol.

To make the esters, 300.0 g of one of the oils were charged under nitrogen to a round bottom flask fitted with a reflux condenser. 1.5 g of lithium neodecanoate were added and the flask and contents were heated to 200° C. for 1 hour. 61.5 g of 1,3-butene diol were added over 5 minutes followed by heating to 240° for 45 minutes. A mixture of autoxidisable unsaturated hydroxy esters was obtained.

300.0 g of the mixture of esters obtained above were added to 174.0 g of methacrylic anhydride contained in a round bottom flask fitted with a reflux condenser. 0.1 g of the methyl ether of hydroquinone (MEHQ) were added as a polymerisation inhibitor and the mixture was heated to 100° C. for 3 hours. An autoxidisable monomer mixture was obtained which comprised methacrylate moieties and unsaturated long chain moieties derived from the oil.

The autoxidisable monomer mixture was converted into an autoxidisable associative thickener as follows. A mixture containing the autoxidisable monomer mixture and the following was made up:

| | |
|---|---|
| Autoxidisable monomer mixture from above | 30.0 g |
| Methacrylic acid | 44.0 g |
| Ethyl Acrylate | 76.0 g |
| Sodium $C_{14}$ to $C_{18}$ sulphonate | 3.0 g |
| Water | 200.0 g |

The mixture was emulsified by subjecting it for 5 minutes to intense agitation provided by a Ross ME-100 Emulsifier operating at 10,000 rpm. 30.0 g of the emulsion obtained were added to 288.0 g of water which had been previously heated to 80° C. under nitrogen. The reactants and water were then maintained at 80° C. until the final cooling. 0.8 g of ammonium persulphate in 16.0 g of water were added to the emulsion in the prior heated water and whole was allowed to stand for 30 minutes. The remainder of the emulsion was added gradually over 2 hours and the whole again allowed to stand for 30 minutes. 0.2 g of t-butyl hydroperoxide was added followed by another 30 minutes stand. Then 0.14 g sodium formaldehyde sulphoxylate in 2.0 g water was added followed by a 30 minute stand. The last two additions and stands were repeated and then the whole was allowed to cool to ambient temperature. An autoxidisable thickener was obtained which could be used to thicken and bind paint.

EXAMPLE 14

Use of Transesterification:

The following mixture was made:

| | |
|---|---|
| Autoxidisable monomer of Example 13 | 160.0 g |
| Ethyl Acrylate | 160.0 g |
| DER 333 (liquid epoxy resin from Dow) | 3.0 g |
| Dibutylamine | 1.5 g |
| MEHQ inhibitor | 0.1 g |

The mixture was charged to a round bottom flask fitted with a glass packed column and heated to 125° C. over a period of 2.5 hours whilst ensuring that the head temperature of the column was kept below 80° C. This caused transesterification to occur after which a distillate of 20 ml was collected from the flask which comprised the autoxidisable monomer.

The autoxidisable monomer was used to make an autoxidisable thickener according to the procedure of Examples 11 to 13 but with the following changes:

| | |
|---|---|
| 1. | 7.5 g of the autoxidisable monomer were used, |
| 2. | 7.5 g of methacrylic acid were used and |
| 3. | 40.0 g of ethyl acrylate were used. |

This thickener can be used in paint formulations as described earlier.

This invention is further illustrated by the drawings of which

FIG. 1 shows a reaction scheme for the copolymerisation of a tall oil methacrylate containing tall oil moiety with other ethylenically unsaturated co-monomers to form a backbone carrying pendant autoxidisable hydrophobic tall oil moieties.

Figure 1:
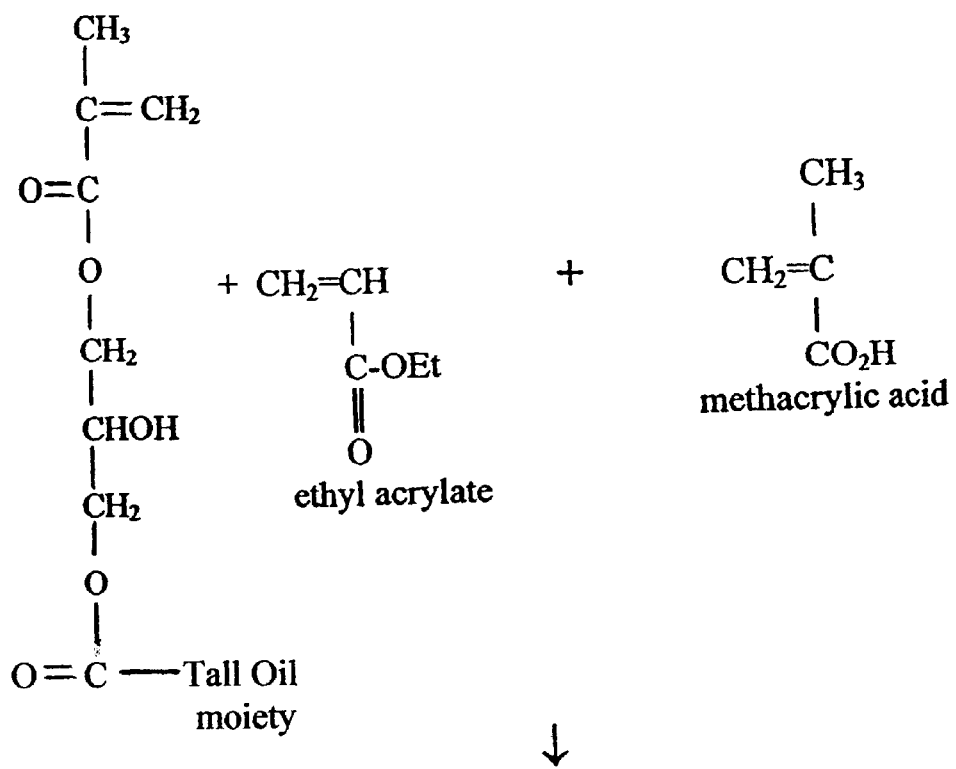
FIG. 1 shows a reaction scheme for introducing pendant hydrophobic moieties onto a polymeric backbone.
Figure 1:
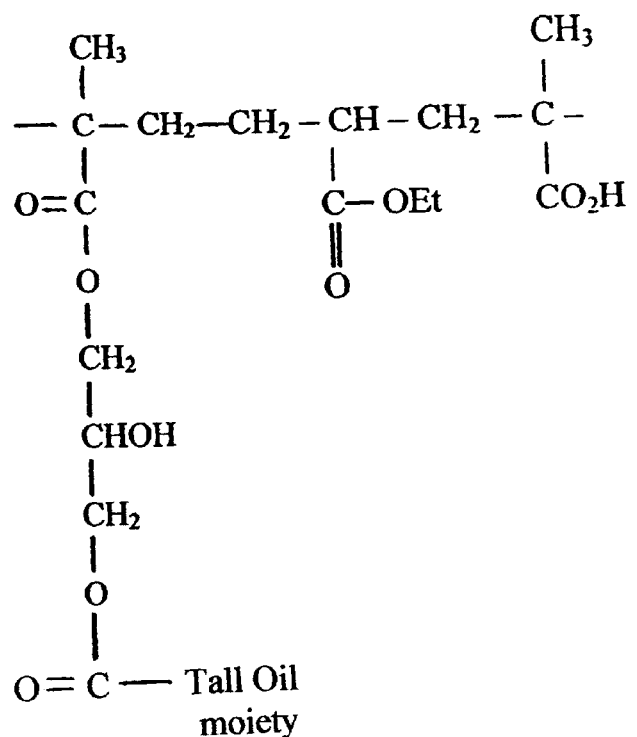
Figure 2:
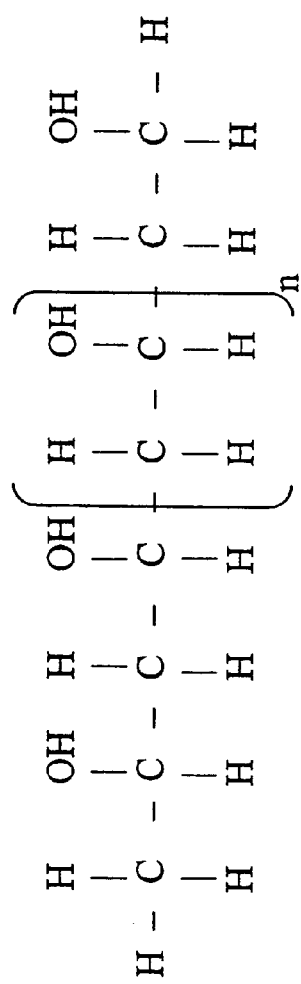
FIG. 2 shows a polymeric backbone containing only carbon atoms.

FIG. 2 shows an all carbon backbone containing 6+2n carbon atoms as might be obtained from the free radical initiated polymerisation and subsequent hydrolysis of vinyl acetate to give a notional polyvinyl alcohol. The chain terminating groups are arbitrarily shown as hydrogen atoms. Pendant hydrophobic moieties could be attached to the backbone by condensation with hydroxyl groups.

Figure 3:
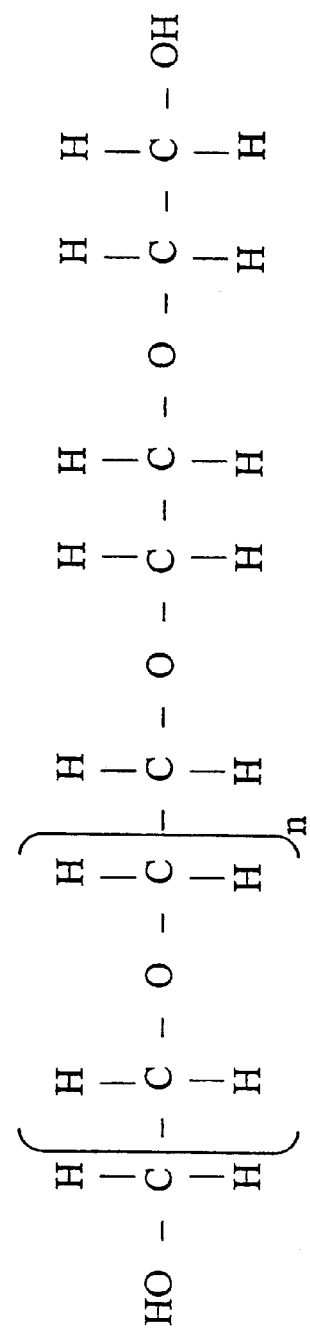
FIG. 3 shows a polymeric backbone containing both carbon and oxygen atoms.

FIG. 3 shows a carbon and oxygen backbone containing 6+2n carbon atoms and 2+n oxygen atoms. Again hydroxyl groups could be used for the attachment of hydrophobic groups.

Figure 4:
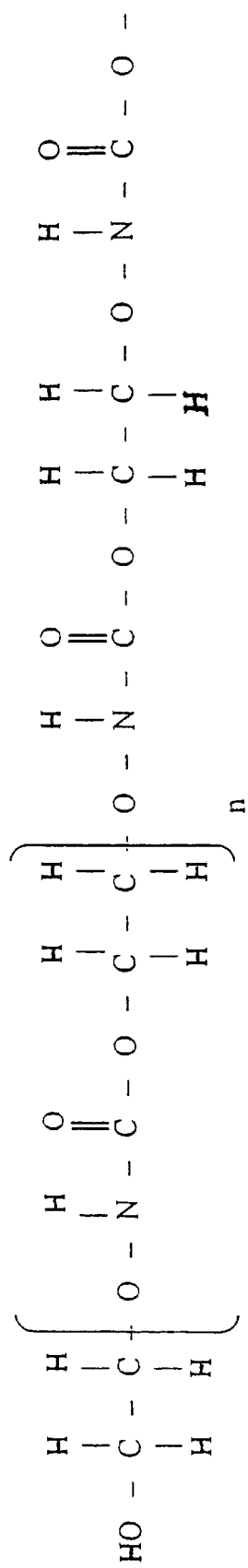
FIG. 4 shows a polymeric backbone containing carbon, oxygen and nitrogen atoms.

FIG. 4 shows a backbone comprising carbon, oxygen and nitrogen atoms as is found in ethoxylate urethanes.

What is claimed is:

1. A thickened aqueous coating composition of a chosen pH, comprising: a polymeric binder and a macromolecular thickener a) which thickener contains macromolecules having moieties which are hydrophilic at the chosen pH and wherein the macromolecules are cellulose-free and also contain autoxidisable moieties thereby creating a cellulose-free autoxidisable thickener, and b) which thickener has particles that in the unneutralised state have a number average particle size of below 500 nm and which thickener on dispersion in water at a concentration of 2 wt % (based on the combined weights of the thickener and water) has a low shear viscosity of at least 0.1 Pa.sec when measured at 18.degree. C. on a Brookfield viscometer using a No. 3 Spindle rotating at 12 rpm.

2. A composition according to claim 1 wherein the composition contains a drier which catalyses autoxidation of the autoxidisable moieties.

3. A composition according to claim 1 where in the autoxidisable moieties are provided by long chain unsaturated fatty acids.

4. A composition according to claim 1 wherein the autoxidisable moieties are provided by a copolymerised diester comprising a divalent hydroxypropylene group.

5. A composition according to claim 1 wherein the macromolecules contain copolymerised styrene or an analogue of styrene.

6. A composition according to claim 1 wherein the composition contains a polyunsaturated compound.

7. A composition according to claim 1 wherein the composition contains more than 3 wt % (based on total weight of the composition) of the thickener.

8. A composition according to claim 1 wherein the composition contains up to 3 wt % (based on the total weight of the composition) of the thickener.

9. A composition according to claim 1 wherein the composition contains less than 30% by volume of solid material.

10. A composition according to claim 1 wherein the polymeric binder and the cellulose-free macromolecular thickener comprise the same material.

11. A composition according to claim 1 wherein the dried coat obtained from said composition has a PVC of at least 70%.

12. A thickened aqueous coating composition of a chosen pH which contains a polymeric binder and a macromolecular thickener a) which thickener contains macromolecules having moieties which are hydrophilic at the chosen pH and b) which thickener on dispersion in water at a concentration of 2 wt % (based on the combined weights of the thickener and water) has a low shear viscosity of at least 0.1 Pa.sec when measured at 18.degree. C. on a Brookfield viscometer using a No. 3 Spindle rotating at 12 rpm wherein the macromolecules are cellulose-free and also contain autoxidisable moieties thereby creating a cellulose-free autoxidisable thickener, wherein the autoxidisable moieties are provided by a copolymerised diester comprising a polyether divalent radical.

13. A thickened aqueous coating composition of a chosen pH which contains a polymeric binder, a polyunsaturated compound, and a macromolecular thickener a) which thickener contains macromolecules having moieties which are hydrophilic at the chosen pH and b) which thickener on dispersion in water at a concentration of 2 wt % (based on the combined weights of the thickener and water) has a low shear viscosity of at least 0.1 Pa.sec when measured at 18.degree. C. on a Brookfield viscometer using a No. 3 Spindle rotating at 12 rpm wherein the macromolecules are cellulose-free and also contain autoxidisable moieties thereby creating a cellulose-free autoxidisable thickener and wherein the polyunsaturated compound contains polybutadiene moieties.

14. A process for making a coating composition of a chosen pH which contains a polymeric binder and a macromolecular thickener a) which thickener contains macromolecules having moieties which are hydrophilic at the chosen pH and b) which thickener on dispersion in water at a concentration of 2 wt % (based on the combined weights of the thickener and water) has a low shear viscosity of at least 0.1 Pa.sec when measured at 18.degree. C. on a Brookfield viscometer using a No. 3 Spindle rotating at 12 rpm wherein the macromolecules are cellulose-free and also contain autoxidisable moieties thereby creating a cellulose-free autoxidisable thickener, wherein the thickener is made by subjecting the co-monomers from which the polymeric backbone is obtained to intensive agitation.

15. A process for making a thickened aqueous coating composition of claim 14 wherein the number average particle size of the thickener is below 500 nm.

16. An architectural paint, lacquer, varnish, woodstain or adhesive comprising a coating composition of a chosen pH which contains a polymeric binder and a macromolecular thickener a) which thickener contains macromolecules having moieties which are hydrophilic at the chosen pH and b) which thickener on dispersion in water at a concentration of 2 wt % (based on the combined weights of the thickener and water) has a low shear viscosity of at least 0.1 Pa.sec when measured at 18.degree. C. on a Brookfield viscometer using a No. 3 Spindle rotating at 12 rpm wherein the macromolecules are cellulose-free and also contain autoxidisable moieties thereby creating a cellulose-free autoxidisable thickener wherein the paint, lacquer, varnish, wood stain, or adhesive has over 3 wt % of the thickener.

17. The architectural paint lacquer, varnish or adhesive of claim 16 wherein the number average particle size of the thickener is below 500 nm.

18. An aqueous thickener A-dispersion of chosen pH for use in coating compositions a) which thickener contains macromolecules having moieties which are hydrophilic at the chosen pH and b) which thickener on dispersion in water at a concentration of 2 wt % (based on the combined weights of the thickener and water) has a low shear viscosity of at least 0.1 Pa.sec when measured at 18.degree. C. on a Brookfield viscometer using a No. 3 Spindle rotating at 12 rpm wherein the macromolecules are cellulose-free and also contain autoxidisable moieties thereby creating a cellulose-free autoxidisable thickener wherein the thickener in the unneutralised state has particles with a number average particle size below 500 nm.

* * * * *